UNITED STATES PATENT OFFICE.

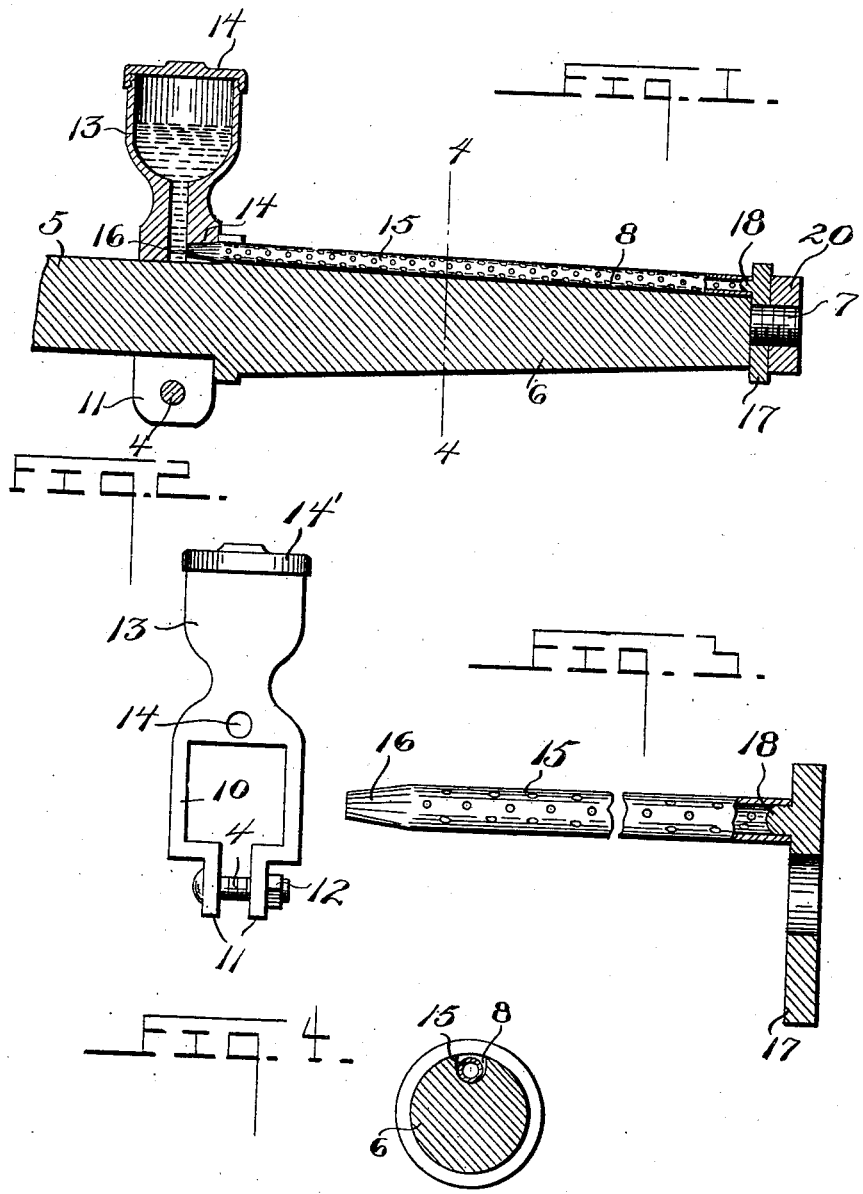

JOHN FRANK GROSS, OF CANTON, OHIO.

AXLE-LUBRICATOR.

968,149.     Specification of Letters Patent.     Patented Aug. 23, 1910.

Application filed October 28, 1909. Serial No. 525,092.

*To all whom it may concern:*

Be it known that I, JOHN FRANK GROSS, a citizen of the United States, residing at Canton, in the county of Stark and State of Ohio, have invented certain new and useful Improvements in Axle-Lubricators, of which the following is a specification.

This invention has relation to certain new and useful improvements in axle lubricators.

The object of my invention, is to provide a simply constructed, readily operated device, arranged to be secured to an axle to provide a lubricating means for the same.

A further object of my invention is to provide an axle spindle with an automatic grease feeding mechanism that can be removed and cleaned.

With these and other objects in view, the present invention consists in the combination and arrangement of parts as will be hereinafter more fully described and particularly pointed out in the appended claims, it being understood that changes in the specific structure shown and described may be made within the scope of the claims without departing from the spirit of the invention.

In the drawings forming a part of this specifications, and in which like numerals of reference indicate similar parts in the several views, Figure 1 shows a central sectional view of a fragmentary portion of an axle provided with my lubricating device. Fig. 2 shows a detail of the grease cup and connected collar. Fig. 3 shows a detached detail of the perforated tube with the securing washer attached. Fig. 4 is a section on line 4—4 of Fig. 1.

In the accompanying drawings the numeral 5 designates the axle, 6 the spindle, and 7 the threaded stud or axle screw, arranged to receive the securing nut. The spindle 6 is provided along its upper surface, with a lengthwise positioned channel 8, running the full length of the spindle. Removably secured to the axle 5 adjacent to the spindle 6, is the clamp collar 10, having the terminal ears 11 with central openings therethrough. This collar is securely fastened to the axle 5 by means of a threaded bolt 4 and a nut 12 engaged with the ears 11. The collar 10 carries the integral oil cup 13, which is provided with a laterally extended tapering exit opening 14, registering with the channel 8. The grease cup 13 is provided with the screw cap 14'.

Held within the channel 8, is an open ended perforated tube 15 having one of its ends 16 tapered. This tapered end 16 is arranged to be removably held within the tapered feed opening 14 of the grease cup. When properly introduced within the grease cup 13, the outer end of this perforated tube 15 ends flush with the end of the spindle, as shown in Fig. 1.

Held upon the stud 7 of the spindle, is the washer 17, having the laterally extending lug 18. The lug 18 is arranged to register with the channel 8 and is of a size so that the same will snugly enter the outer end of the perforated grease feeding tube 15 as shown in Fig. 3. A suitable bur 20 is arranged to be held upon the threaded stud 7, and holds the washer 17 against the end of the spindle 6.

From the foregoing it will be seen that the oil feeding tube 15 can be readily inserted by simply introducing the tapered end 16 into the socket 14 and then engaging the lug 18 with the outer end of the tube. The grease escapes through the reduced end of the cup, into the perforated tube 15, and so fills the channel, and this channel being located at the highest point of the spindle, will insure the spindle being thoroughly lubricated. Should the openings within the perforated tube 15 clog at any time it will simply be necessary to remove this tube and pick out the clogged material.

My lubricating device is arranged to be attached to and used in connection with the axle spindles of the usually employed pleasure and work vehicles, and it is simply necessary to channel the spindles of the axles and then attach the collar and retaining washer, so that the perforated tubes will be properly held within the spindle channels.

What is claimed is:—

1. In combination, an axle the spindle of which is provided with the usual axle screw and which has a lengthwise positioned channel running the whole length of the spindle, an oil cup removably secured to the axle adjacent to said spindle having a laterally extending tapered opening registering with said channel, an open ended perforated tube tapered at one end and held within said channel and extending to the end of said spindle, said tapered end held within said tapered opening, and a washer upon said stud with a projected lug to enter said tube.

2. The combination of an axle spindle having a channel, of an oil cup adjustably secured adjacent said spindle, a perforated tube in said channel and having one end within said oil cup and a washer provided with a laterally extended lug to engage said perforated tube.

3. The combination with an axle spindle, of an oil cup having a clamped collar engaged with the spindle and having an extended feed opening, a perforated tube within said opening, and a washer engaged with the end of the spindle and provided with a projecting lug to enter said tube.

In testimony whereof I affix my signature, in presence of two witnesses.

JOHN FRANK GROSS.

Witnesses:
GARFIELD A. ROLY,
C. E. YUTZEY.